United States Patent [19]
Johnson et al.

[11] 3,765,618
[45] Oct. 16, 1973

[54] CANE POLE REEL

[75] Inventors: Paul C. Johnson; Larry L. Lilland; Earl E. Siemon, all of Spirit Lake, Iowa

[73] Assignee: Berkley & Company, Inc., Spirit Lake, Iowa

[22] Filed: Aug. 10, 1971

[21] Appl. No.: 170,584

[52] U.S. Cl............ 242/84.1 R, 242/84.5 R, 242/99
[51] Int. Cl.............................................. A01k 89/02
[58] Field of Search................ 242/84.5 R, 84.51 R, 242/125.3, 125.2, 99

[56] References Cited
UNITED STATES PATENTS

| | | | |
|---|---|---|---|
| 1,284,039 | 11/1918 | Atwood........................ | 242/84.51 R |
| 2,711,292 | 6/1955 | Taggart et al............ | 242/84.51 R X |
| 2,458,298 | 1/1949 | Polevoy.................... | 242/84.51 R X |

FOREIGN PATENTS OR APPLICATIONS

| | | | |
|---|---|---|---|
| 1,152,234 | 9/1957 | France............................ | 242/125.3 |

*Primary Examiner*—Billy S. Taylor
*Attorney*—Orrin M. Haugen

[57] ABSTRACT

Reel means for fishing line including frame means for releasably retaining a line receiving spool, and being adapted to permit rotation of a line receiving spool retained therein. The frame includes foot means for securing the reel to the gripping handle of the fishing pole and is provided with a generally disc-shaped plate disposed along one side of the frame for engaging at least a portion of one lateral flange of the line receiving spool. A line spool engaging plate is arranged in opposed relationship to the disc-shaped plate, and is provided with a surface for engaging a radially extending rib formed in the core of the spool, with the line spool engaging plate rotating means with the spool. Eccentrically arranged handle means are coupled to the line spool engaging plate for rotation of the line spool within the frame, and a shaft is provided for engaging and supporting the central core of the line receiving spool and for accommodating rotation of the spool within the frame. The mounting shaft means is secured to the disc-shaped plate, and mounted against rotation within the frame, and has an enlarged head at one end for engaging the outer surface of the line spool engaging plate, with means preferably being provided for reducing the coefficient of friction between the head of the mounting shaft and the line spool engaging plate.

8 Claims, 4 Drawing Figures

PATENTED OCT 16 1973

3,765,618

INVENTORS
Paul C. Johnson,
BY Larry L. Lilland,
Earl E. Siemon
Orrin M. Haugen
ATTORNEY

CANE POLE REEL

BACKGROUND OF THE INVENTION

The present invention relates generally to a reel means for fishing line, and more particularly to a reel which is arranged to releasably retain a line receiving spool therewithin, with means being provided to permit rotation of the line receiving spool within the reel frame. In addition to the conventional needs of a fishing reel, it is frequently desirable to provide a means for quickly changing line spools while in the field, without requiring a complete dismantling of the reel structure. With the advent of inexpensive line spools, such as plastic molded line spools, it becomes practical to dispense line on such a spool, and provide the fisherman with a convenient means for interchanging the individual line spools while in the field.

SUMMARY OF THE INVENTION

Briefly, the improved fishing reel means of the present invention comprises frame means for releasably retaining a line receiving spool, with means for accommodating rotation of the spool within the frame. The frame includes a foot means for securing the reel to the gripping handle of a fishing pole and is provided with a generally disc-shaped plate disposed along one side of the frame for engaging at least a portion of the surface of a flange of the line receiving spool. A plate means is arranged in opposed relationship to the disc-shaped plate of the frame and thus provides a means for retaining the spool within the frame. A mounting shaft is also provided for engaging and supporting the central core of the spool, with the mounting shaft accommodating rotation of the spool within the frame means. In operation, the user may change line spools by merely removing the mounting shaft means from the structure and replacing the spool with a spool containing fresh line. No special requirements are set forth for the line receiving spool other than it be provided with a central core which constitutes a bushing or sleeve about the periphery of the mounting shaft, and further that it include the conventional lateral flanges. If desired, a means may be provided for securing the spool directly with the line spool engaging plate, such as, for example, by providing arcuately spaced radially extending ribs within the core of the line spool.

Generally, the fishing reel of the present invention may be utilized with fly rods for conventional fly casting, or with cane poles or ice fishing devices, it being understood that when a simple pole or shaft is utilized, at least one line guide should be disposed adjacent the tip in order to control the disposition of the line along the axial extent of the pole. The structure is also provided with foot means for securing the reel structure to the gripping handle of a fishing pole. The structure may be fabricated from molded plastic parts, and hence is corrosion free and not prone to freeze-up in sub-zero weather.

Therefore, it is a primary object of the present invention to provide an improved inexpensive reel means for fishing line which is constructed to accommodate a relatively simple and expeditious changing of line spools retained in the reel.

It is yet a further object of the present invention to provide an improved fishing reel structure which includes a line spool for receiving fishing line thereon, and which is readily provided with drag means for controlling the dispensing of line from the reel under all operating conditions.

It is yet a further object of the present invention to provide an improved reel means for fishing line which may be fabricated from plastic molded parts on an inexpensive and expeditious basis.

Other and further objects of the present invention will become apparent to those skilled in the art upon a study of the following specification, appended claims, and accompanying drawing.

DESCRIPTION OF THE PREFERRED EMBODIMENT

Figures 1, 2, 3, 4:
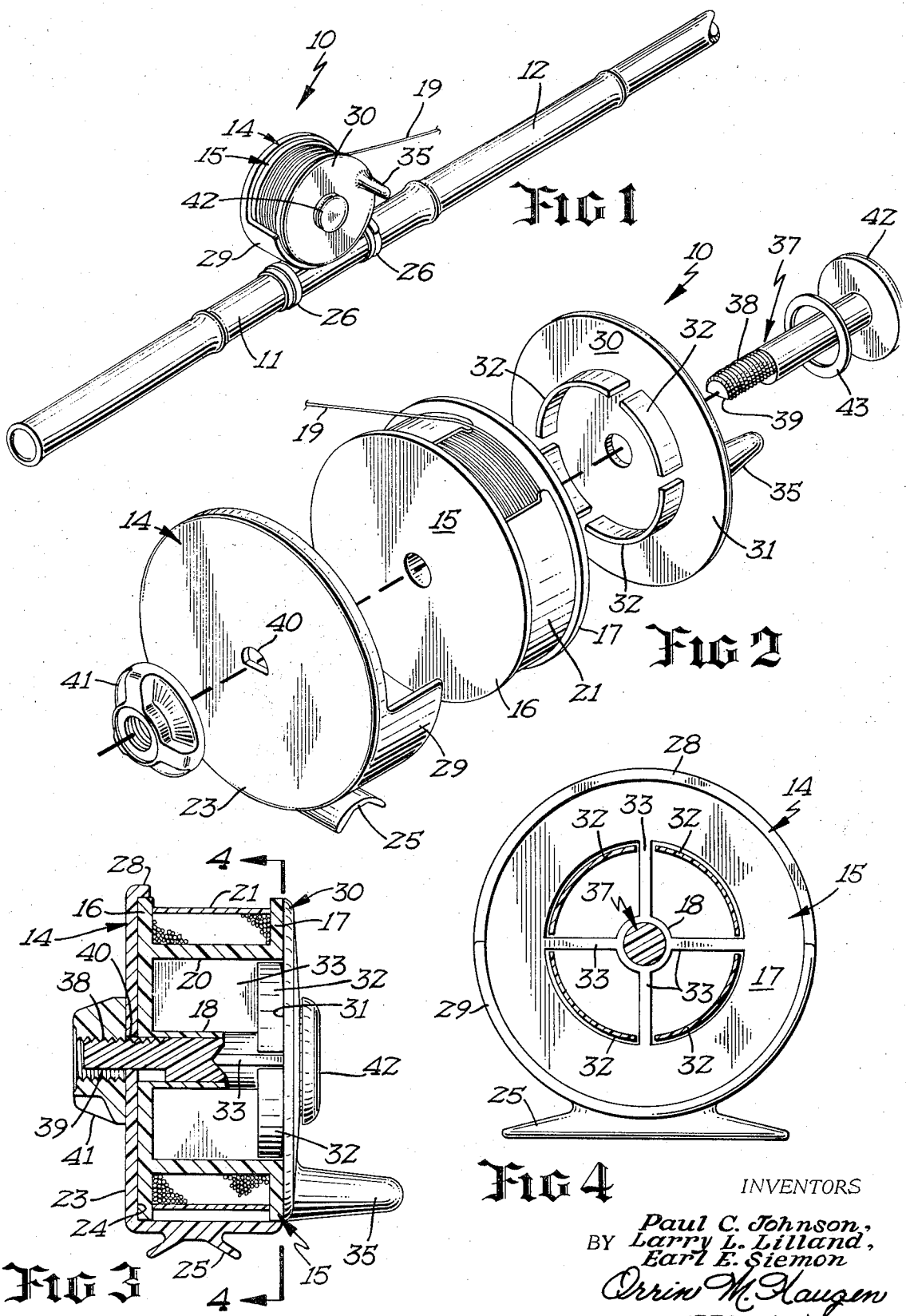
FIG. 1 is a perspective view of a fishing reel prepared in accordance with the present invention shown mounted upon the gripping handle portion of a fishing pole, with the pole being partially broken away.
FIG. 2 is a detail exploded perspective view showing the arrangement of components utilized in the fishing reel structure of the present invention.
FIG. 3 is a vertical sectional view taken through the diameter of the major components of the reel, and illustrating the structure of FIG. 2 in assembled disposition.
FIG. 4 is a vertical sectional view taken along the line and in the direction of the arrows 4—4 of FIG. 3.

In accordance with the preferred embodiment of the present invention, and with particular attention being directed to FIG. 1, the fishing reel structure generally designated 10 is shown mounted upon the gripping handle portion 11 of the fishing pole 12. The reel 10 includes a frame means generally designated 14, with the frame 14 being adapted to releasably retain line receiving spool generally designated 15 thereon. Spool 15 has first and second laterally disposed flanges 16 and 17, arranged on opposite sides of a central core 18, core 18 being shown best in FIG. 3. A length of line such as line 19 is shown wound upon the winding hub 20 of spool 15. Shield 21 may be utilized to enclose the outer winding of line 19, as indicated in FIGS. 2 and 3.

With particular attention now being directed to FIG. 3 of the drawing, it will be seen that frame means 14 is provided with a generally disc-shaped plate 23, plate 23 being arranged along one side of the frame means 14 and adapted to engage at least a portion of the surface of the flange 16 of line receiving spool 15. Contact is made between plate 23 and flange 16 along the juncture point shown at 24. Frame means 14 further includes a mounting foot with tips 25—25, for accommodating mounting of the reel of the gripping handle of the fishing pole. Means such as the coupling rings 26—26 may be utilized to engage the extremities of each of the tips 25—25 in order to accommodate mountinf the reel upon the gripping handle portion 11 of pole 12.

With continued attention being directed to FIGS. 2 and 3 of the drawing, it will be seen that the disc-shaped plate 23 is provided with flanged guide ring 28 around the periphery thereof, flanged ring 28 being utilized to guide the flange 16 of spool 15 during rotation of spool 15. The flange guide ring 28 is extended axially into a cradle means 29 adjacent the base of frame 14 for additional guiding of the spool during rotation within the frame means 14.

The reel means further includes a line spool engaging plate generally designated 30 which is arranged in opposed relationship to plate 23, plate 30 having a surface for engaging flange 17 of spool 15, and further being arranged for rotation with spool 15. Plate 30 has a surface 31 which is concave to spool flange 17 in order to accommodate mounting of plate 31 against spool 15, and also to better control the force applied laterally against spool 15 to urge it toward the juncture point 24.

Plate 30 is provided with a plurality of arcuately spaced flange elements 32—32, these flange elements being arranged to engage the four radial extending ribs such as ribs 33—33 formed in the core of line spool 15 (see FIG. 4). Plate 30 is further provided with an eccentrically arranged handle element 35 for accommodating rotation of the spool within the frame.

Mounting shaft means generally designated 37 are provided for engaging and supporting the core 18 of line receiving spool 15 within the frame means, the mounting shaft being secured to the disc-shaped plate 23 and being mounted against rotation within frame 14. In order to resist rotation, the tip end portion 38 of mounting shaft 37 is provided with a flat area as at 39, flat area 39 being arranged to be received within bore 40 formed in plate 23. Thus, the shank portion of shaft 37 is a shaft upon which core 18 is free to rotate. Locking nut 41 is threadedly engaged to tip end 38 of shaft 37, and thus provides a means for holding the arrangement intact. Shaft 37 has an enlarged head component as shown at 42, with head 42 being separated from plate 30 by means of low friction washer element 43. The torque which is utilized to screw nut 41 onto shaft 37 will determine the frictional resistance experienced in rotating spool 15 within frame means 14. Washer 43, which is preferably fabricated from polytetrafluoroethylene (Teflon), is utilized to reduce the coefficient of friction which would otherwise exist between the mounting shaft 37 and the line spool engaging plate area 23.

In the event the user wishes to change line spools, it will be appreciated that he merely has to remove nut 41 from the assembly, pull mounting shaft 37 therefrom, and then merely exchange one line spool 15 for another. Such an exchange may be readily conducted in the field without need for extensive effort or unusual tools.

As has been indicated, the structure of the present invention may be fabricated from molded plastic parts. In order to provide for controlled friction between flange 16 and plate 23, it will normally be desirable to have spool 15 fabricated from either polystyrene or polystyrene copolymers. The coefficient of friction for these materials is not particularly low, and thus the engaging surfaces between the spool and the reel plate permit controlled drag to occur. It is also possible to fabricate the structure of the spool from materials such as polyethylene, polypropylene, ABS, or the like.

We claim:

1. Reel means for fishing line comprising:
   a. frame means releasably retaining a line receiving spool having a central core and first and second laterally disposed flanges secured to said core, said core having a radially extending rib formed therein, and means for rotatably mounting said line receiving spool within said frame means;
   b. said frame means including foot means for securing said reel to the gripping handle of a fishing pole and a generally disc-shaped plate disposed along one side of said frame means for engaging at least a portion of the surface of said first lateral flange of said line receiving spool;
   c. line spool engaging plate means arranged in opposed relationship to said disc-shaped plate and having a surface engaging the second lateral flange of said line receiving spool and arranged for rotation with said line receiving spool within said frame means, said spool engaging plate having at least one arcuately formed flanged element for engaging said radially extending rib formed in the core of said line spool, and eccentrically arranged handle means coupled to said plate means for cranking rotation of said line receiving spool within said frame means; and
   d. mounting shaft means engaging and supporting the central core of said line receiving spool for rotation of said line receiving spool within said frame means, said mounting shaft means being secured to said disc-shaped plate and mounted against rotation within said frame means.

2. The reel means as defined in claim 1 being particularly characterized in that the spool engaging face of said disc-shaped plate is provided with a flanged guide ring extending toward and generally circumscribing said first lateral flange.

3. The reel means as defined in claim 1 being particularly characterized in that arcuate cradle means are provided adjacent the base of said frame means and extend toward said first lateral flange, and circumscribing at least a portion thereof for guiding said spool during rotation thereof within said frame means.

4. The reel means as defined in claim 1 being particularly characterized in that said mounting shaft means is threadedly and adjustably engaged with tension nut means disposed against the outer surface of said disc-shaped plate.

5. The reel means as defined in claim 1 being particularly characterized in that said mounting shaft means is provided with head means for engaging a substantial area along the outer surface of said line spool engaging plate.

6. The reel means as defined in claim 5 being particularly characterized in that means are provided for reducing the coefficient of friction between said mounting shaft means and said line spool engaging plate.

7. The reel means as defined in claim 6 being particularly characterized in that said means for reducing the coefficient of friction is an annular disc consisting essentially of polytetrafluoroethylene.

8. The reel means as defined in claim 1 being particularly characterized in that the line spool engaging surface of said line spool engaging plate means is formed concave toward said second lateral flange.

* * * * *